United States Patent Office 3,027,349
Patented Mar. 27, 1962

3,027,349
PROOFING PLASTICS WITH PHOSPHOROUS COMPOUNDS
Ulrich Bahr, Karl-Heinz Andres, and Günther Braun, Leverkusen, Germany, assignors to Farbenfabriken Bayer Aktiengesellschaft, Leverkusen, Germany, a corporation of Germany
No Drawing. Filed Oct. 5, 1959, Ser. No, 844,223
11 Claims. (Cl. 260—45.7)

This invention relates to flame retarding agents and more particularly to halogen substituted phosphorous compounds which are capable of imparting flame resistance to plastics generally and are particularly useful for imparting flame resistance to polyurethane plastics.

It is known to employ phosphorous compounds as flame retarding agents. For example, monomeric phosphoric acid esters and thiophosphoric acid esters containing halogenated alkyl radicals have been added to plastics to reduce their combustibility. Also, phosphites such as tri-(beta-chloroethyl) phosphite have proven particularly effective. Phosphites of this type are readily obtainable by reacting trihalo phosphorous, such as $PCl_3$, with an alkylene oxide such as ethylene oxide. However, these compounds are monomeric and cannot be chemically combined into plastics and therefore gradually evaporate due to their low molecular weight so that their flame retarding effect on the plastic is lost. Moreover, these compounds reduce the impact resistance of the polymers and sometimes cause a considerable deterioration in the other physical properties such as resistance to hydrolysis of the plastics which are made flame resisting therewith. It is also known to prepare phosphorous compounds by an intramolecular rearrangement of phosphites to form monomeric phosphones. They suffer from the same disadvantages as the monomeric phosphites. Phosphorous containing compounds containing halogenated organic radicals have not been available heretofore which would satisfactorily provide flame resistance to plastics without unduly modifying their physical properties.

It is an object of this invention to provide improved flame retarding agents. A further object of this invention is to provide plastics with improved resistance to flame. Another object of this invention is to provide polyurethane plastics with improved flame resistance. Still another object of this invention is to provide polymeric phosphorous compounds. A further object of the invention is to provide an improved process for the preparation of flame retarding phosphorous compounds and a method of employing the same in the production of flame retardant plastics and particularly polyurethane plastics.

The foregoing objects and other which will become apparent from the following description are accomplished in accordance with the invention, generally speaking, by providing polymeric phosphonic acid derivatives obtained from the condensation of phosphites containing at least two alkylene radicals at least one of these alkylene radicals being halogenated at temperatures from about 180° C. to about 300° C. and plastic compositions containing the same. Thus, this invention contemplates polymeric phosphonic acid esters having the general formula:

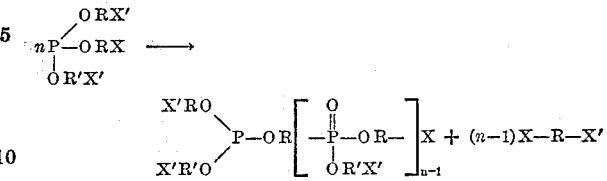

wherein R is alkylene and R' is alkylene or arylene, X is halogen, X' is halogen or hydrogen and n is at least one, and combinations thereof with plastics to improve their resistance in flame.

The preparation of the polymeric phosphonic acid esters of the present invention is an example of an intermolecular Arbusow reaction. See Kabachnik, Rossiiskaya, Izvest. Akad. Nauk USSR, Otdel, Khim. Nauk (1946), 295, 403, 515. The preparation of these compounds may be illustrated by the following equation:

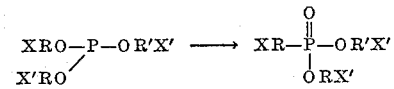

$$X'RO\!\!\diagdown\!\!P-OR\left[-\overset{O}{\underset{OR'X'}{\overset{\|}{P}}}-OR-\right]_{n-1}\!\!X\,+\,(n-1)X-R-X'$$

wherein R is alkylene, R' is alkylene or arylene and X is halogen, X' is halogen or hydrogen. In the foregoing equation n is at least two and is preferably within the range of from 2 to about 10. It is essential that the reaction outlined above be carried out at temperatures above about 180° C. and preferably below a temperature of about 300° C. If temperatures below about 180° C. are employed, the phosphite will rearrange to form a monomeric phosphonic acid ester which cannot be condensed with additional phosphite. In other words at temperatures above about 180° C. an intermolecular condensation type of reaction occurs yielding polymeric phosphonic acid derivatives containing a terminal phosphite as shown above, whereas at lower temperatures an intermolecular rearrangement occurs yielding only monomeric phosphonic acid derivatives which may be illustrated as follows:

$$XRO-\underset{X'RO}{\overset{}{P}}-OR'X' \longrightarrow XR-\overset{O}{\underset{ORX'}{\overset{\|}{P}}}-OR'X'$$

The product of the intramolecular rearrangement will not undergo further condensation to yield a polymer of the type shown above. At temperatures above 180° C. the condensation reaction outlined above proceeds to produce compounds where n in the equation is two or more and if tri-(beta-chloroethyl) phosphite is employed, compounds having a molecular weight above about 440 and some lower molecular weight products are obtained which can be removed by subsequent heating under partial pressure to about 200° C. to about 225° C. The polymeric phosphonic acid esters of the invention are highly viscous liquids which are compatible with a large variety of plastics and which impart flame resistance thereto.

The polymeric phosphonic acid esters containing halogenated alkylene radicals may be prepared by the condensation of any suitable phosphite or mixtures thereof, such as, for example, tri-(beta-chloroethyl) phosphite, tri-(gamma-chloropropyl) phosphite, bis-(beta-chloroethyl)-para-chlorophenyl phosphite, tri-(omega-chlorolauryl) phosphite, tri-(beta-bromoethyl) phosphite, tri-(2,3-dichloropropyl) phosphite, bis-(beta-chloroethyl) phenyl phosphite and compounds having the formula

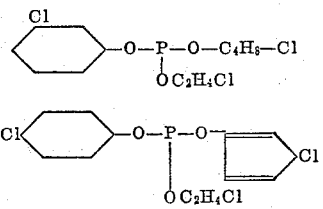

and the like.

It can be seen, therefore, that the alkylene radicals in the foregoing generic formula can be any suitable alkylene radical, such as, for example, ethylene, propylene, butylene and the like and the arylene radical may be any suitable arylene radical, such as, for example, phenylene, diphenylene, naphthalene, toluylene, and the like and X may be chlorine, bromine, iodine and the like. While it is essential that at least one alkylene radical be halogen

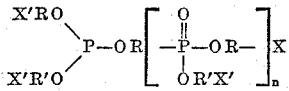

substituted, the other alkylene radicals and arylene radical may or may not be halogen substituted, i.e., the aromatic radical may also be aryl, such as, phenyl, naphthyl and the like.

The polymeric phosphonic acid esters of the invention may be used to impart flame resistance to any suitable plastic such as, for example, polyurethane plastics, vinyl plastics, styrene, polyamides, acrylic and methacrylic polymers, polyesters, natural and synthetic latex rubbers, polycarbonates, polycondensates and polyaddition products such as, for example, copolymers of unsaturated polyesters and monomeric copolymerizable ethylene derivatives, phenol formaldehyde resins, urea formaldehyde resins, melamine formaldehyde resins and epoxy resins and the like. The polymeric phosphonic acid esters may be incorporated into the plastics in any convenient manner, for example, during their preparation, but they are preferably added to the components of the plastics while said components are still liquid and prior to final curing of the plastic with the formation of cellular structures, molded elements or coatings and the like. Best results are obtained when additional components are also added to plastics of the foregoing types which are non-combustible or only burn with difficulty. Any suitable amount of the phosphonic acid esters may be used to impart flame resistance to plastics, but it is preferred to employ at least about 2 percent by weight of the polymeric phosphonic acid esters. Amounts greater than about 20 percent by weight are generally not required but may be used.

In addition to the flame resistance imparted to plastics by the polymeric phosphonic acid esters, a marked decrease in hydrolytic degradation and water absorption is also noted in many instances.

Any suitable polyurethane plastic may be used in the process of the present invention, such as, for example, polyurethane plastics obtained from the reaction of a polyester, a polyhydric polyalkylene ether, a polyester amide or any other suitable compound containing at least two active hydrogen containing groups, said active hydrogen containing groups being reactive with an —NCO group, with an organic polyisocyanate. Any suitable organic polyisocyanate may be used, such as, for example, 2,4-toluylene diisocyanate, 2,6-toluylene diisocyanate and mixtures thereof, 4,4'-diphenyl methane diisocyanate, 1,5-naphthalene diisocyanate, para-phenylene diisocyanate, hexamethylene diisocyanate, p,p',p''-triphenyl methane triisocyanate and the like. Any suitable polyester may be used and may contain either terminal hydroxyl groups or terminal carboxyl groups depending on the proportion of polyhydric alcohol and polycarboxylic acid used in their preparation. Any suitable polyhydric alcohol may be used, such as, for example, ethylene glycol, 1,3-propylene glycol, 1,4-butylene glycol, trimethylol propane, glycerine, pentaerythritol, N,N'-tetrakis (2 hydroxy propyl) ethylene diamine and the like. Any suitable polycarboxylic acid may be used, such as, for example, adipic acid, sebacic acid, phthalic acid, terephthalic acid, maleic acid, malonic acid, fumaric acid, oleic acid, ricinoleic acid, as well as mixtures thereof with difunctional monocarboxylic acids, such as, for example, hydroxy stearic acid and the like.

Any suitable polyhydric polyalkylene ether may be used, such as, for example, the condensation product of alkylene oxides, such as, for example, ethylene oxide, propylene oxide, butylene oxide, amylene oxide and the like or of such alkylene oxides with polyhydric alcohols, such as, for example, ethylene glycol, 1,4-butane diol, trimethylol propane, glycerine, pentaerythritol, and the like. The polyhydric polyalkylene ethers may be prepared by any suitable process, such as, for example, by the process disclosed by Wurtz in 1859 and in "Encyclopedia of Chemical Technology," volume 7, pages 247–262, published by Interscience Publishers, Inc., 1951, and in U.S. Patent 1,922,459.

Any suitable polyester amide may be used, such as, for example, the condensation product of one of the aforementioned polycarboxylic acids employed in the preparation of said polyesters with a diamine, such as, for example, ethylene diamine, para-amino-aniline and the like, as well as mixtures thereof with one of the above-mentioned polyhydric alcohols used in the preparation of either the polyesters or polyhydric polyalkylene ethers.

Any suitable vinyl plastic may be used, such as, for example, polyvinylidene chloride, vinylidene chloride copolymers, such as are sold under the tradename Saran, vinyl pyrrolidone and more particularly N-vinyl pyrrolidone and the like. Suitable processes for the preparation of compounds of this type may be found in "Polymers and Resins" by Golding, published by D. Van Nostrand Company, Inc., 1959.

Any suitable styrene plastic may be used, such as are obtained for example, from any suitable aromatic vinyl compound including styrene and styrene copolymers with butadiene and the like. Suitable processes for the preparation of this type of plastic which are well known in the art may be found in "Polymers and Resins" by Golding, published by D. Van Nostrand Company, Inc., 1959.

Any suitable polyamide may be used, such as, for example, those obtained from a diamine and a dicarboxylic acid. Any suitable diamine may be used, such as, for example, 1,6-hexamethylene diamine, ethylene diamine and the like. Any suitable dicarboxylic acid may be used, such as, for example, adipic acid, sebacic acid, phthalic acid and the like.

Any suitable acrylic and/or methacrylic polymer may be used, such as, for example, polymers and copolymers of acrylic and/or methacrylic acid as well as those formed by heating ethylene cyanohydrin with sulfuric acid and an alcohol, such as, for example, butyl alcohol and the like.

Any suitable polyester resin may be used, such as, for example, those obtained from an aromatic polycarboxylic acid, an unsaturated aliphatic polycarboxylic acid and a polyhydric alcohol, such as, for example, the polyester obtained from tetrachlorophthalic acid anhydride, fumaric acid, and 1,4-butane diol.

Any suitable latex may be used, such as, for example, the synthetic latex obtained from 2-chloro-1,3-butadiene or chloroprene as well as natural rubber latex obtained from the Hevea tree of Brazil and the like.

Any suitable polycarbonate may be used, such as, for example, the polycarbonate obtained from the reaction, p,p'-dihydroxy diphenyl dimethyl methane with phosgene and the like. Although the polycarbonates are generally non-combustible in thick sections, thinner sheets or foils of polycarbonate will burn and will benefit from the inclusion of the polymeric phosphonic acid esters of the invention.

Any suitable phenol formaldehyde resin may be used such as are obtained, for example, from the condensation of phenol, cresol and the like with formaldehyde and/or any suitable substance which will yield formaldehyde, such as, for example, paraformaldehyde and the like. Any suitable urea formaldehyde resin may be used, such as, are obtained, for example, from dimethylol urea and one of the afore-mentioned formaldehydes or formaldehyde yielding compounds. Any suitable melamine plastic may be used such as are obtained, for example, from dicyandiamide in the presence of ammonia and reacting the resulting melamine with formaldehyde to give methylol melamines which may be subsequently polymerized to obtain resinous materials. Any suitable epoxy resin may be used, such as, for example, those obtained from epichlorohydrin and 4,4'-dihydroxy diphenyl dimethyl methane and the like.

The plastics of the invention may be used in many applications including cushions, windows, gears, coatings and the like.

The invention is further illustrated by the following examples in which the parts are by weight.

Example 1

Tri-(beta-chloroethyl) phosphite is quickly heated to a temperature greater than about 180° C., either batchwise or in a continuous process and ethylene chloride is split off with a strong evolution of heat to form a liquid reaction product which has been identified as a polymeric phosphonic acid ester containing some fractions of lower boiling points which may be removed preferably by evacuation at elevated temperature, advantageously at about 200° C. to about 225° C. under a pressure of about 10 mm. Hg.

*Analysis.*—Content of phosphorous 15.2%; molecular weight 480; $n_D^{20}=1.4898$.

Reinforced glass fibre test elements of the approximate dimensions 3 x 15 x 120 mm. are produced using a polyester resin mixture consisting of about 70 parts of a polyester prepared from about 1.5 mols of tetrachlorophthalic acid anhydride, about 0.8 mol of fumaric acid, about 2.5 mols of butane-1,3-diol, and about 30 parts of styrene, after adding benzoyl peroxide as polymerization catalyst and about 5 percent by weight of tri-(beta-chloroethyl) phosphite or about 5 percent by weight of the previously described polymeric phosphonic acid ester of tri-(beta-chloroethyl) phosphite. The said element is ignited under the action of a Bunsen burner flame for about 30 seconds, with the test element disposed above the heart of the flame. After removing the flame, the smouldering time of the test element produced with addition of tri-(beta-chloroethyl) phosphite is about 50 seconds, and that of the test element produced with addition of polymeric phosphonic acid ester is only about 30 seconds, while a test element made without addition of a flame-proofing agent burns completely away. The mechanical properties of the three test elements are shown by the following table:

|  | Without additives | 5 percent tri-(beta-chloroethyl) phosphite | 5 percent polymeric phosphonic acid ester |
| --- | --- | --- | --- |
| Impact toughness according to DIN 53453_____cm. kg./cm.² | 1.3 | 0.8 | 1.2 |
| Bending strength_____kg./cm.² | 750 | 535 | 740 |
| Bending angle_____degrees | 9 | 9 | 10 |
| Ball pressure hardness: | | | |
| After 10 sec_____kg./cm.² | 1,760 | 1,710 | 1,720 |
| After 60 sec_____kg./cm.² | 1,670 | 1,620 | 1,680 |
| Martens_____degrees | 85 | 57 | 83 |

Example 2

About 100 parts of a polyester prepared from about 1 mol of adipic acid, about 2 mols of phthalic anhydride, about 1 mol of oleic acid and about 5 mols of trimethylol propane and having an hydroxyl content of about 11.8 percent are mixed with about 20 parts of the polymeric phosphonic acid ester obtained from tri-(beta-chloroethyl) phosphite by heating above about 180° C. as flame-proofing agent and thoroughly mixed by stirring with an activator mixture consisting of about 2 parts of dimethylbenzylamine and about 5 parts of an approximately 54 percent aqueous solution of the sodium salt of castor oil sulphate. Added to this mixture are about 110 parts of a 65:35 technical mixture of 2,4- and 2,6-toluylene diisocyanate which is modified with about 13 parts of a copolymer prepared from 1 mol of 2,4-toluylene diisocyanate and 1 mole of diphenylmethane-4,4'-diisocyanate. With a strong foaming action, there is obtained a foam material which is characterized by the following values:

Bulk density_____ 40 kg./m³.
Breaking strength_____ 1.5 kg./cm.².
Impact toughness according to
  DIN 53453_____ 0.07 cm. kg./cm.².
Bending strength under heat_____ 140° C.
Water absorption_____ 0.1 percent by volume.

The foam does not shrink and has very good resistance to flame. If a plate of the foam material with the approximate dimensions 15 x 12 x 2 cm. is held for about 5 seconds at an angle of about 45° in the upper third of a Bunsen burner flame, the flame is extinguished after about 3 seconds from the time of removing the foam from the flame. When using the former flame-proofing agents, such as, for example, tri-(beta-chloroethyl) phosphite, the flame is only extinguished after 10 seconds. An improvement is also found in decreasing water absorption, which is only about 0.1 percent, as compared with about 1 percent with foam mixtures not containing a flame-proofing agent.

Example 3

About 80 parts of a polyester, obtained from about 5.1 mols of adipic acid, about 1 mol of phthalic anhydride and about 8.4 mols of hexanetriol and and having an hydroxyl content of about 8.5 percent, are mixed with about 20 parts of a polyester, obtained from about 1.43 mols of adipic acid, about 1 mol of hexanetriol and about 1 mol of butylene-1,3-glycol and having an hydroxyl content of about 6.5 percent, and with about 20 parts of the polymeric phosphonic acid ester obtained from tri-(beta-chloroethyl) phosphite by heating above about 180° C. and thoroughly mixed by stirring with an activator mixture consisting of about 3 parts of dimethyl benzylamine and about 5 parts of an approximately 54 percent aqueous solution of the sodium salt of castor oil sulphate. While stirring thoroughly, this mixture has added thereto about 99 parts of the toluylene diisocyanate employed in Example 2 which is modified as indicated in Example 2. With strong foaming, there is obtained a foam material with the following values:

Bulk density_____ 45 kg./m³.
Breaking strength_____ 2 kg./cm.².
Impact toughness according to
  DIN 53453_____ 0.13 cm. kg./cm.².
Bending strength under heat_____ 125° C.
Water absorption_____ 0.1 percent by volume.

This foam has a very low water absorption and very good flame-proofing qualities. The flame test carried out in the same way as in Example 2 results in an extinguishing of the flame after smouldering for about 4 seconds.

Example 4

About 1 mol of thiodiglycol, about 1 mol of 2,2-bis-(4-hydroxy-3,5-dichlorophenyl) propane and about 0.7 mol of trimethylol propane with addition of about 0.2 percent by weight of p-toluene sulphonic acid are condensed until an OH number of about 300 is reached. About 10 parts of the resulting polyether are mixed with about 10 parts of an approximately 70 percent solution of the adduct of about 3 mols of a mixture of about 60 percent 2,6- and about 40 percent 2,4-toluylene diisocyanate and about 1 mol of trimethylol propane in aceto-acetic acid ester and about 5 parts of the polymeric phosphite obtained from heating tri-(beta-chloroethyl) phosphite to a temperature above about 180° C. and applied in a thin layer. After about 24 hours at room temperature, a lacquer film is obtained which can only be ignited with difficulty.

Example 5

Tri-(2,3-dichloropropyl) phosphite prepared from PCl₃ and epichlorhydrin is quickly heated in an atmosphere of carbon dioxide to 210–230° C. With a strong evolution of heat to about 300° C. and with splitting off 1,2,3-trichloropropane a polymeric phosphonic acid ester is formed. After removing the lower boiling point fractions by heating to 220° C./10 mm. for 2 hours the highly viscous yellow oil has the following properties:

Content of phosphorous_____percent__ 9.4
Molecular weight_____ 750
$n_D^{20}$ _____ 1.5162

100 parts by weight of methacrylic acid methyl ester are mixed with 15 parts by weight of the above polymeric phosphonic acid ester and with 0.05 part by weight of azo diisobutyric acid dinitrile. The mixture is polymerized by heating to 60° C. for 48 hours. A hard clear resin is obtained which when ignited under the action of a Bunsen burner flame will no longer burn after removal of the flame.

It is to be understood that any of the other plastics described herein can be substituted for the ones used in the preceding examples with equally satisfactory results. Moreover, any other suitable polymeric phosphonic acid ester as more particularly set forth above may be substituted along with any other suitable reactant, filler, catalyst and the like for any one of those specified in the examples.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

It is to be understood that the organic compounds containing groups reactive with an organic polyisocyanate contemplated herein are organic compounds having at least two hydrogen atoms determinable by the Zerewitinoff method.

What is claimed is:

1. Flame resistant polyurethane plastics containing a flame resisting amount of a polymeric phosphonic acid ester having the formula

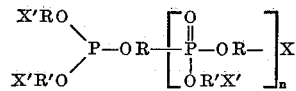

wherein R is alkylene and R' is selected from the group consisting of alkylene and arylene, X is halogen, X' is selected from the group consisting of halogen and hydrogen and n is from 1 to 10.

2. Flame resistant cellular polyurethane plastics containing a flame resisting amount of a polymeric phosphonic acid ester having the formula

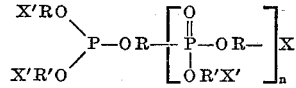

wherein R is alkylene and R' is selected from the group consisting of alkylene and arylene, X is halogen, X' is selected from the group consisting of halogen and hydrogen and n is from 1 to 10.

3. Flame resistant polyurethane plastics containing a flame resisting amount of a polymeric phosphonic acid ester having the formula

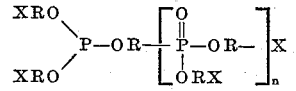

wherein R is alkylene, X is chlorine and n is from 1 to 10.

4. Flame resistant polyurethane plastics containing from about 2 percent to about 20 percent by weight of a polymeric phosphonic acid ester having the formula

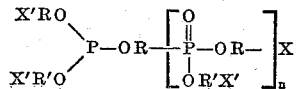

wherein R is alkylene and R' is selected from the group consisting of alkylene and arylene, X is halogen, X' is selected from the group consisting of halogen and hydrogen and n is from 1 to 10.

5. Flame resistant cellular polyurethane plastics containing from about 2 percent to about 20 percent by weight of a polymeric phosphonic acid ester having the formula

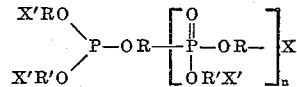

wherein R is alkylene and R' is selected from the group consisting of alkylene and arylene, X is halogen, X' is selected from the group consisting of halogen and hydrogen and n is from 1 to 10.

6. Flame resistant polyurethane plastics containing from about 2 percent to about 20 percent by weight of a polymeric phosphonic acid ester having the formula

wherein R is alkylene, X is chlorine and n is from 1 to 10.

7. Flame resistant plastics containing from about 2 percent to about 20 percent by weight of a polymeric phosphonic acid ester having the formula

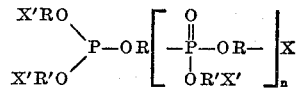

wherein R is alkylene and R' is selected from the group consisting of alkylene and arylene, X is halogen, X' is selected from the group consisting of halogen and hydrogen and n is at least one.

8. The flame resistant plastics of claim 7 wherein said polymeric phosphonic acid ester is obtained from tri-(beta-chloroethyl) phosphite.

9. The flame resistant plastics of claim 7 wherein said polymeric phosphonic acid ester is obtained from tri-(2,3-dichloropropyl) phosphite.

10. The flame resistant plastics of claim 7 wherein R' is alkylene.

11. Flame resistant plastics containing a flame resisting amount of a polymeric phosphonic acid ester having the formula

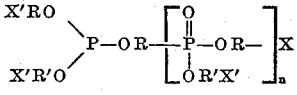

wherein R is alkylene and R' is selected from the group consisting of alkylene and arylene, X is halogen, X' is selected from the group consisting of halogen and hydrogen and n is from 1 to 10.

References Cited in the file of this patent

UNITED STATES PATENTS 2,806,831    Beindorff _____ Sept. 17, 1957

OTHER REFERENCES

Kosolapoff: "Organophosphorus Compounds," 1st edition, 1950, page 123, John Wiley & Sons, N.Y.C., N.Y.